United States Patent
Suit (10) Patent No.: US 12,175,298 B1
(45) Date of Patent: *Dec. 24, 2024

(54) DYNAMIC CONSOLIDATION OF VIRTUAL MACHINES

(71) Applicant: Google LLC, Mountain View, CA (US)

(72) Inventor: John Michael Suit, Mount Airy, MD (US)

(73) Assignee: Google LLC, Mountain View, CA (US)

( * ) Notice: Subject to any disclaimer, the term of this patent is extended or adjusted under 35 U.S.C. 154(b) by 423 days.

This patent is subject to a terminal disclaimer.

(21) Appl. No.: 17/536,047

(22) Filed: Nov. 28, 2021

Related U.S. Application Data (63) Continuation of application No. 16/821,914, filed on Mar. 17, 2020, now abandoned, which is a continuation of application No. 14/700,375, filed on Apr. 30, 2015, now Pat. No. 10,592,266, which is a continuation of application No. 13/478,966, filed on May 23, 2012, now Pat. No. 9,043,785.

(60) Provisional application No. 61/488,911, filed on May 23, 2011.

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 9/5083* (2013.01); *G06F 9/45533* (2013.01); *G06F 2009/45591* (2013.01); *G06F 9/5077* (2013.01); *G06F 2209/5022* (2013.01)

(58) Field of Classification Search
CPC .... G06F 9/505; G06F 9/45558; G06F 9/5083; G06F 9/45533; G06F 9/5077; G06F 2009/45591; G06F 2209/5022
USPC ............................................................ 718/1
See application file for complete search history.

(56) References Cited

U.S. PATENT DOCUMENTS

| | | |
|---|---|---|
| 6,823,509 B2 | 11/2004 | Webb |
| 7,865,686 B2 | 1/2011 | Akimoto |
| 8,990,823 B2 | 3/2015 | Blythe et al. |
| 9,043,785 B1 | 5/2015 | Suit |
| 10,592,266 B1 * | 3/2020 | Suit .......................... G06F 9/505 |
| 2007/0043860 A1 | 2/2007 | Pabari |
| 2009/0089780 A1 | 4/2009 | Johnson et al. |
| 2010/0138829 A1 | 6/2010 | Hanquez et al. |
| 2012/0072571 A1 | 3/2012 | Orzell et al. |

\* cited by examiner

*Primary Examiner* — Bradley A Teets
(74) *Attorney, Agent, or Firm* — Lerner David LLP (57) ABSTRACT

A method and apparatus are disclosed of monitoring a number of virtual machines operating in an enterprise network. One example method of operation may include identifying a number of virtual machines currently operating in an enterprise network and determining performance metrics for each of the virtual machines. The method may also include identifying at least one candidate virtual machine from the virtual machines to optimize its active application load and modifying the candidate virtual machine to change its active application load.

20 Claims, 4 Drawing Sheets

DYNAMIC CONSOLIDATION OF VIRTUAL MACHINES

TECHNICAL FIELD OF THE INVENTION

The present invention is generally related to a dynamic virtual machine analysis and modification procedure, and more particularly, to an application used to monitor virtual machine activity and perform inferences used to augment the virtual machine operation to accommodate drift in the system configuration.

BACKGROUND OF THE INVENTION

Currently, traditional enterprise networks may include various nodes that contribute to an overall business process. The network nodes may include both physical and virtual machines. Enterprise networks may include virtual machines and physical hosts, which are required to provide an allocation of resources. In the past, the first wave of x86 virtualization included the consolidation of physical hosts into virtual machines (VMs). As with physical hosts, the manner in which the VMs operate is directly subject to the configuration that is instantiated on that machine. Traditional configuration management solutions are subject to changes or "drift" to a pre-existing VM configuration. Dynamic enterprise network environments include varying resources and may require frequent modifications or updates to the configuration of VMs. A proactive approach to accommodating such dynamic enterprise networks may include determining virtual machine requirements by a business application flow. In response, the VMs may be dynamically modified based on feedback from the observations made by a virtual management infrastructure and the utilization of an inference engine.

SUMMARY OF THE INVENTION

An example embodiment of the present invention may include a method of identifying a plurality of virtual machines currently operating in an enterprise network and determining a plurality of performance metrics for each of the plurality of virtual machines. The method may include identifying at least one candidate virtual machine from the plurality of virtual machines to optimize its active application load and modifying the at least one candidate virtual machine to change its active application load.

Another example embodiment of the present invention may include an apparatus including a processor configured to identify a plurality of virtual machines currently operating in an enterprise network, and determine a plurality of performance metrics for each of the plurality of virtual machines. The processor may also be configured to identify at least one candidate virtual machine from the plurality of virtual machines to optimize its active application load, and modify the at least one candidate virtual machine to change its active application load. The apparatus may also include a transmitter configured to transmit modification information to the at least one candidate virtual machine.

DETAILED DESCRIPTION will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present disclosure provide a system, apparatus, method and/or non-transitory computer program product configured to dynamically consolidate virtual machines in an enterprise communication and/or networking environment. Similar to the consolidation of physical machines, it is also optimal to dynamically consolidate the configuration and/or functionality of virtual machines VMs. One example may provide automatically determining a proactive change in one or more VM's configuration by observing corresponding applications and configuration settings of the VM.

The VM observation application according to example embodiments may be operated by a VM application that gathers information by performing signal intelligence or intelligence gathering by interception of signals based on signal interception (SIGINT) traffic analysis. By employing SIGINT information gathering and analysis, the observing application may determine optimum virtual machine operating metric(s) and make corresponding changes to optimize VM operations.

Employing SIGINT functionality permits the VM observation system and corresponding application to determine the configuration mix required and further orchestrate a change in presently operating applications and settings. The observing application will first detect the connectivity between a virtual machine and a storage device via a virtual management vendor's application programming interface(s) (APIs). The connectivity will then be monitored for a predetermined period. The virtual machine's usage and communication signaling may result in changes in state provided by the virtual management vendor's APIs in combination with the data received from within the virtual machine's OS. As a result of obtaining such VM specific information, the application and/or processing system will process this information using the SIGINT algorithm to determine the most optimal interaction between the VM and the corresponding virtual storage. Additional factors are considered by the process, such as the speed of the storage, capacity, recovery from fault tolerances, and other variables provided by the virtual storage combination of vendors.

Figure 1:
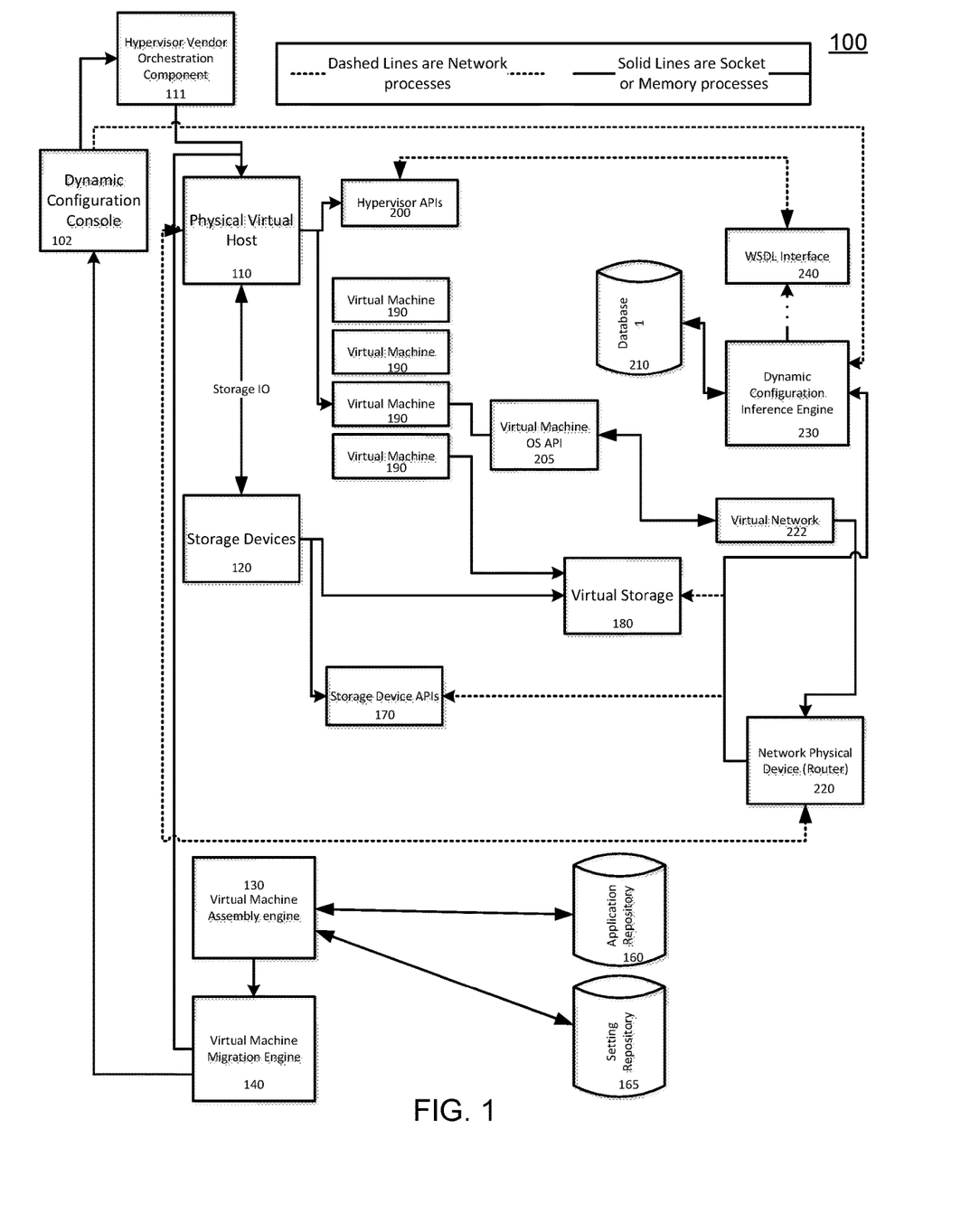
FIG. 1 illustrates a logic diagram of a virtual machine communication interface of a virtual storage configuration according to example embodiments.

FIG. 1 illustrates an example dynamic virtual machine configuration according to example embodiments. Referring to FIG. 1, a console web service definition language (WSDL) interface 240 may represent an application installed on a communication device (i.e. server). The WDSL interface 240 may transmit requests for enterprise virtualization information from the various application programming interfaces (APIs), such as hypervisor API 200, API interface to console 415, storage device APIs 170, and virtual machine OS API 205 reflected in the architecture of FIG. 1. In response, the APIs may provide detailed information about the configuration, allocation, and performance of the virtual machines (VMs) operating in the enterprise environment including both previously logged VM performance data and current VM performance data.

The hypervisor API 200 may provide certain basic and fundamental VM information via the API interface 410. Such information may include a host identifier (ID), a host name, a host Internet protocol (IP) address, a host media access control address (MAC), a host memory resource and corresponding allocation, and a host storage resource and corresponding allocation. Other information may include a VM ID, a VM name a VM IP address, a VM MAC address, a VM memory resource and utilization, a VM storage resource and utilization, and a VM storage resource and utilization. Other information obtained may include a VM network type, resource, and status.

The basic API information for console API console 415 may include a host memory resource and corresponding allocation, a host storage resource and corresponding allocation, a host storage resource and corresponding allocation, a host business logic assignment to one or more of a VM ID, a VM name, a VM IP address, a VM MAC address, a VM memory resource and present utilization, and a VM business logic assignment, etc.

The virtual machine OS API 205 may include a machine name, a machine IP address, a machine MAC, a present machine 'NETSTAT®' connection list, a machine application list, a machine performance statistics, a present machine processes list, a machine services list, etc. The storage device API 170 contains a device type, a device bandwidth, device connections, a device state, a device status, a device ID, a device IP address, a device MAC address and a route.

A 'NETSTAT®' report may be generated by an operating system level application invoked by a direct command script or API call to provide the requestor with information about what applications are communicating with what other machines in an operating environment. For example, the 'NETSTAT®' command is used to display the TCP/IP network protocol statistics and related communication information and may be an external command available in most MICROSOFT® operating systems.

Monitoring virtual machine connectivity or activity may be performed by using a network statistic application (i.e., "NETSTAT®"). For example, NETSTAT® may be a command-line tool that displays network connections for both incoming and outgoing connections, routing tables, and other network interface statistics (e.g., access attempts, packets received, packets transmitted, lost packets, errors, etc.). NETSTAT® may be operated on a Unix, Unix-compatible, and Windows based operating systems.

A 'NETSTAT®' report provided by the VMs OS API 205 may include a local address, a foreign address, a state, a protocol, a process ID, received packets, received bytes and/or sent bytes. The WSDL 240 may seek to identify certain VM information including a VM IP address, an application source, a destination IP address, an application process list, performance statistics (Perfmon), a standard OS configuration files list, state statistics from the OS, etc.

Applications required to accomplish a dynamic configuration may include a standard OS process communication monitoring program, such as 'NETSTAT®', a dynamic configuration inference engine 230, a relational database repository 210, and a virtualization orchestration application component 111. The retrieved VM data received may be formatted into a tabular limited format. Each line in the record is processed by the dynamic configuration inference engine 230 utilizing a SIGINT based frequency algorithm that devises the optimum record observed for the sampling cycle. The frequency algorithm may be configured to identify certain patterns in VM performance by measuring different types of command executions over predefined intervals (e.g., how many "WRITE" operations are performed by a particular VM to a particular storage having a particular size and were performed successfully without error).

The participating VMs 190, as assigned by the configuration console 102, are queried for state, performance, communication application connectivity, and process lists. A list is created by the inference engine 230 to determine which VMs 190 can continue to operate but are additionally eligible to increase their application mix (mix-up) (i.e., increase processing load, increase number of applications currently being processed, increase number of active connections etc). An application mix-up may be any number of applications being utilized by the VM(s). Example applications may include a web server application, database applications, business applications, custom applications, etc. The VMs 190 may be identified individually and their respective application pool may be identified to determine if the amount of current resources (e.g., CPU usage, memory usage, storage usage, etc.) may be further optimized (lessened and/or reallocated) to yield a similar output. The VMs 190 may be linked to a virtual storage 180 for storage related applications.

The participating VMs 190 as assigned by the configuration console 100 are queried for state, performance, communication application connectivity, and process lists on an ongoing basis. As a result, the virtual infrastructure APIs are queried for state, performance, communication application connectivity, and process lists. A VM that is active in the network communicating with other VM's as part of a business application process would be considered "participating." VMs that are not working in concert with others would be considered a "non-participating" VM. An active VM would be considered any VM that is utilizing resources from the hypervisor or host. An example of state of performance, connectivity, and process lists may include on or off for a state, communicating yes/no for connectivity, and a result may include information, such as protocol TCP, local address hope 4409, www.computerhope.com: telnet, and state established. Another example may include protocol TCP, local address hope 3708, multicity.com: 90 and state close_wait.

The candidate VMs 190 are analyzed by the inference engine 230 based on the utilization of the input they receive from the WSDL 240. The configuration assembly engine 130 clones the candidate VMs utilizing the VM vendors APIs, and inserts the new application mix and associated configuration settings 165 associated with those applications 160. The new application mix may add and/or subtract an application from the VMs present application mix-up/pool. The total number of applications currently being operated by a particular VM may increase or decrease on any given VM. The configuration mix may also change for any particular VM which may include the allocation of resources provided by the virtualization infrastructure, such as the hypervisor orchestration component 111. The hypervisor APIs 200 may list the resources to be reallocated via a list or configuration list file that is transmitted to the VM(s). The configuration list file may include reallocation of any or more of memory usage (RAM), storage usage (GBs), CPU usage (GHz), etc. The configuration mix may actually be specified by a particular association mix of memory, CPU, storage used to perform a particular task or application. In other words, each application currently operating on the VMs 190 may have its own configuration mix of resources to identify and determine which application(s) can survive and operate nominally with a different configuration mix. The questions may then be answered whether certain VMs can operate certain applications with less resources or a reduced configuration mix. If so, a reallocation of resources may be performed to release previously allocated resources on the VMs 190.

A copy of the newly loaded VM application profile of the VM 190 is sent via the VM infrastructure physical device router 220 to a physical host 110 for testing and analysis. The router 220 may also be coupled to a virtual network 222 that provides communication and routing information. The VM application profile may include a configuration file that includes the names of the active applications, the corresponding resource allocation of the configuration mix and other pertinent information used to identify the VM. The configuration file may only include the names of applications that are being added or subtracted from a previous configuration file (deltas). The VM migration engine 140 requests VM specific information from the WSDL 240, and as a result the VMs 190 are queried for state, performance, and/or process lists, to determine its viability for migration into the production environment. If the candidate VMs perform at or exceed the acceptable threshold level of migration, as assigned by the dynamic configuration console 102, then the migration engine 140 will send the VM 190 identification information to the orchestration component 111 of the virtualization infrastructure. The above-noted process may be iterated through multiple times until all VMs 190 are analyzed for dynamic configuration candidates. The process is continually monitored by the dynamic configuration console 102.

The network connectivity may indicate that a VM may or may not have to modify its network stack if its application does not need to communicate with other machines. If the candidate VMs perform at or exceed the acceptable threshold level of migration then they still work without requiring additional resource allocation from the hypervisor. So if a VM is a candidate to have its number of applications increased/decreased and other potential changes, then the baseline of the VM may be identified by a VMs current allocation. This is determined by querying the virtual infrastructure APIs, such as a VMWARE VSPHERE® API to determine a VMs current operating status.

The physical virtual host 110 may include a physical computer that is able to execute several virtual machine images to support the VM configuration of the VM system 100. The host 110 distributes its resources among the virtual machines that execute on the host. The host 110 may be coupled to a storage device(s) 120 for additional database functionality and/or storage capabilities. This physical computer may be referred to as a hypervisor in the virtualization field. The host 110 may be a server or a group of servers configured to manage the various resources designated to the VMs 190. The VMs 190 provide the same functions to the network as their physical counterparts. For example, a virtual administrator utilizing a virtual infrastructure management application, such as VMWARE®'s 'VCENTER™', or MICROSOFT® 'HYPER-VR Server 2008' either assigns names or names are created by a virtualization infrastructure management application according to a predefined scheme.

Figure 2:
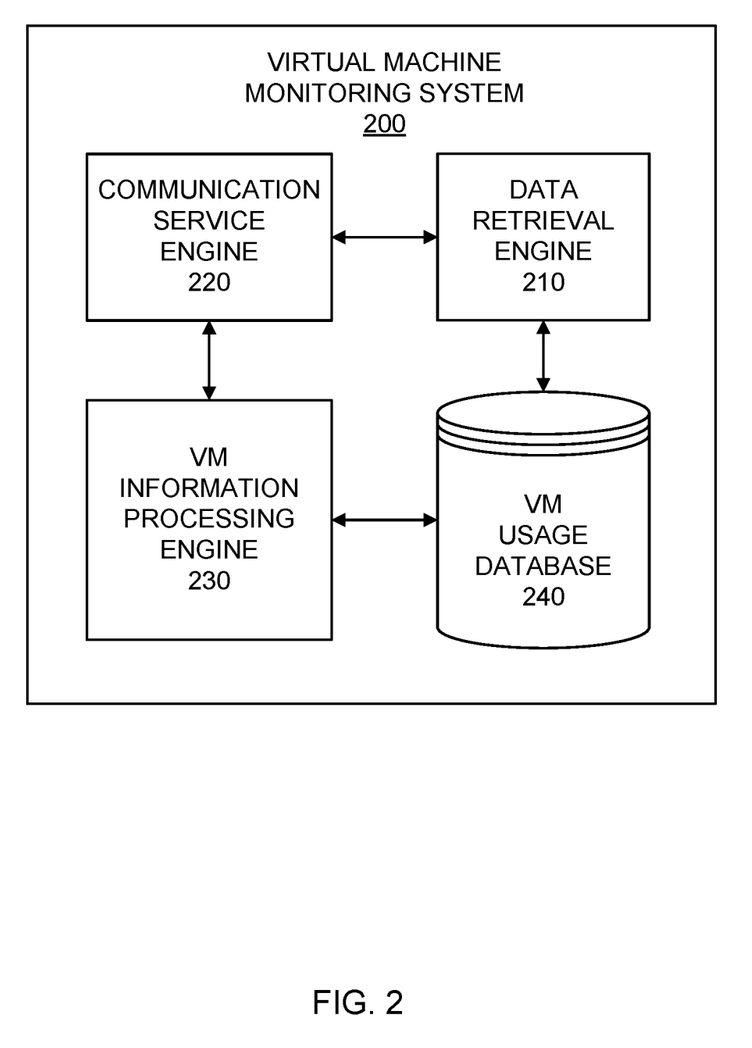
FIG. 2 illustrates an example virtual machine system configured to perform various operations associated with the example embodiments.

FIG. 2 illustrates an example virtual machine monitoring system 200 according to example embodiments. Referring to FIG. 2, one example operation may include identifying a number of virtual machines currently operating in an enterprise network by a communication service engine 220 that communicates with the physical host and identifies which virtual machines are currently operating. The system 200 also determines a number of performance metrics for each of the virtual machines, the metrics may be pre-defined and stored in log file stored in the VM usage database 240 and retrieved by a command sent to the data retrieval engine 210. The system may also identify at least one candidate virtual machine from the various virtual machines to optimize its active application load. The candidate VM may be identified as having a lower number of active applications than a predetermined threshold as measured by the VM information processing engine 230. The candidate VM may also have an optimal/non-optimal amount of usage statistics or metrics which make it a candidate for greater/fewer applications, etc. The VM candidate may have its baseline modified to have its present active application load increased or decreased based on the measured usage statistics or metrics.

The active application load of the candidate VM may be optimized by increasing a number of active applications currently being operated by the at least one candidate virtual machine. The active application load may instead by optimized by decreasing a number of active applications currently being operated by the at least one candidate virtual machine. The plurality of performance metrics may include at least one of a number of active applications, an amount of processor utilization or allocation, an amount of memory utilization or allocated and an amount of data storage currently utilized or allocated. After the VM is modified, the various performance metrics for each of the virtual machines may be periodically audited to determine additional optimization modifications of the virtual machines.

According to one example, the modifications and optimization efforts may include generating a new application pool for the candidate virtual machine which includes at least one change in a present application pool that is currently being utilized by the candidate virtual machine (i.e., increase or decrease in the number of active applications). The new application pool information may be stored in a configuration file which is transferred to the candidate virtual machine. The configuration file may include specific application information of the applications to be used by the candidate VM, and may also include a reallocation baseline of any or more of a memory usage, storage usage and a CPU usage used by the candidate virtual machine.

Example embodiments are preferably realized in a hardware device, such as, a computer, cellular phone, or other mobile terminal device, etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 3 illustrates an example network element 300, which may represent any of the above-described network components of the other figures.

Figure 3:
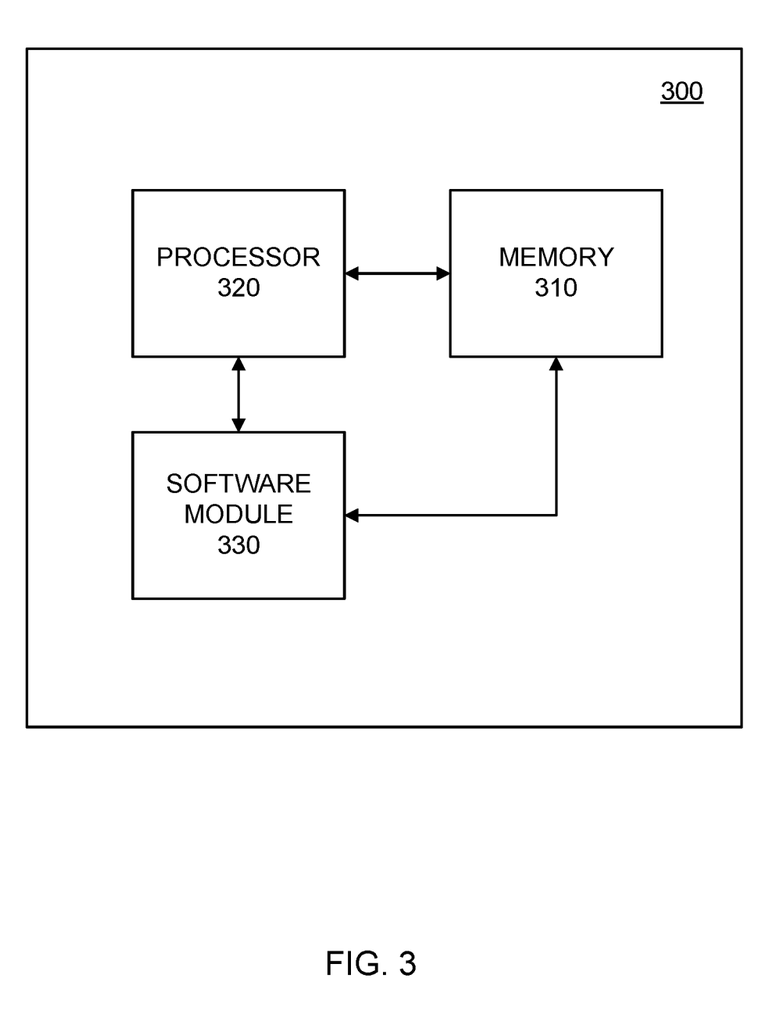
FIG. 3 illustrates an example network entity configured to store instructions and processing hardware for performing operations according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
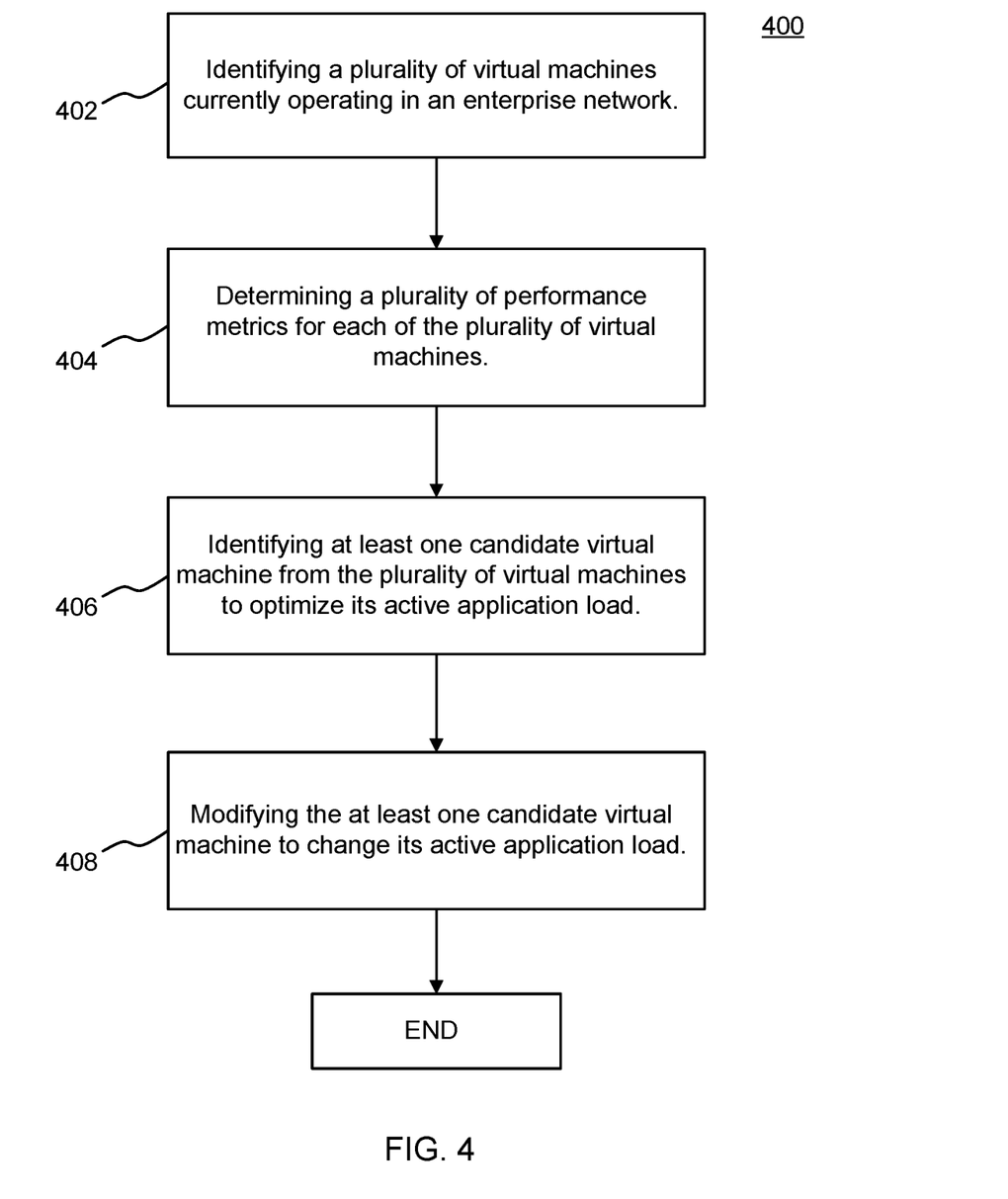
FIG. 4 illustrates an example flow diagram of a method of operation according to example embodiments of the present invention.

FIG. 4 illustrates an example method of operation 400 according to example embodiments. Referring to FIG. 4, a method of monitoring and modifying a present state of a virtual machine is disclosed, the method may include identifying a plurality of virtual machines currently operating in an enterprise network at operation 402. The method may also include determining a plurality of performance metrics for each of the plurality of virtual machines at operation 404 and identifying at least one candidate virtual machine from the plurality of virtual machines to optimize its active application load at operation 406. The method may also include modifying the at least one candidate virtual machine to change its active application load at operation 408.

Although an exemplary embodiment of the system, method, apparatus and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems 100, 200 and 300 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   determining a plurality of performance metrics for each of a plurality of virtual machines comprising at least one of memory usage and processor (CPU) usage currently utilized by the plurality of virtual machines;
   modifying a candidate virtual machine from the plurality of virtual machines to optimize its respective active application load based on at least one of the memory usage and the processor usage of the candidate virtual machine;
   wherein the modifying of the candidate virtual machine changes its active application load by changing a total number of applications operated by the active application load assigned to the candidate virtual machine;
   generating a new application pool for the candidate virtual machine comprising a new application mix of a plurality of applications with at least one change from a present application pool currently assigned to the candidate virtual machine, wherein the at least one change in the present application pool comprises a change in a number of applications included in the present application pool assigned to the candidate virtual machine, and wherein a configuration file comprises the new application pool and a reallocation list of the plurality of performance metrics including the memory usage and the CPU usage assigned to each of the plurality of applications assigned to the candidate virtual machine, wherein each of the plurality of applications have different configuration mixes of amounts of the memory usage and the CPU usage assigned to the respective plurality of applications to be used by the candidate virtual machine;

transmitting the configuration file to the candidate virtual machine; and reallocating at least one performance metric used by the candidate virtual machine based on the configuration file.

2. The method of claim 1, wherein the active application load is optimized by increasing a number of active applications currently operated by the candidate virtual machine.

3. The method of claim 1, wherein the active application load is optimized by decreasing a number of active applications currently operated by the candidate virtual machine.

4. The method of claim 1, wherein the new application pool comprises at least two applications which are assigned to the candidate virtual machine.

5. The method of claim 1, wherein the plurality of performance metrics further comprises at least one of a number of active applications, an amount of processor (CPU) utilization, an amount of memory, and an amount of data storage.

6. The method of claim 1, further comprising periodically repeating the determining of the plurality of performance metrics for each of the plurality of virtual machines to determine additional optimization modifications to the plurality of virtual machines.

7. The method of claim 1, further comprising storing the new application pool based on the new application mix.

8. The method of claim 1, wherein the new application mix comprises a total number of application names identifying each of the at least two applications assigned to the candidate virtual machine, in a configuration file.

9. An apparatus, comprising:
at least one processor configured to:
determine a plurality of performance metrics for each of a plurality of virtual machines, comprising, at least one of memory usage and processor (CPU) usage currently utilized by the plurality of virtual machines;
modify a candidate virtual machine from the plurality of virtual machines to optimize its respective active application load based on at least one of the memory usage and the processor usage of the candidate virtual machine;
wherein the modification of the candidate virtual machine to change its active application load by a change in a total number of applications operated by the active application load assigned to the candidate virtual machine;
generate a new application pool for the candidate virtual machine comprising a new application mix of a plurality of applications with at least one change from a present application pool currently assigned to the candidate virtual machine, wherein the at least one change in the present application pool comprises a change in a number of applications included in the present application pool assigned to the candidate virtual machine;
wherein a configuration file comprises the new application pool and a reallocation list of the plurality of performance metrics includes the memory usage and the CPU usage assigned to each of the plurality of applications assigned to the candidate virtual machine, wherein each of the plurality of applications have different configuration mixes of amounts of the memory usage and the CPU usage assigned to the respective plurality of applications to be used by the candidate virtual machine; and
a transmitter configured to transmit the configuration file to the candidate virtual machine,
wherein the processor is further configured to reallocate at least one performance metric used by the candidate virtual machine based on the configuration file.

10. The apparatus of claim 9, wherein the active application load is optimized by an increase in a number of active applications currently operated by the candidate virtual machine.

11. The apparatus of claim 9, wherein the active application load is optimized by a decrease in a number of active applications currently operated by candidate virtual machine.

12. The apparatus of claim 9, wherein the plurality of performance metrics further comprise at least one of a number of active applications, an amount of processor (CPU) utilization, an amount of memory, and an amount of data storage.

13. The apparatus of claim 9, wherein the new application pool comprises at least two applications which are assigned to the candidate virtual machine.

14. The apparatus of claim 9, wherein the at least one processor is further configured to periodically repeat the plurality of performance metrics determined for each of the plurality of virtual machines to determine additional optimization modifications to the plurality of virtual machines.

15. A non-transitory computer readable storage medium configured to store instructions that, when executed by at least one processor, cause the at least one processor to:
determine a plurality of performance metrics for each of a plurality of virtual machines, comprising at least one of memory usage and processor (CPU) usage currently utilized by the plurality of virtual machines;
modify a candidate virtual machine from the plurality of virtual machines to optimize its respective active application load based on at least one of the memory usage and the processor usage of the candidate virtual machine;
wherein the modification of the candidate virtual machine changes its active application load by changing a total number of applications operated by the active application load assigned to the candidate virtual machine;
generate a new application pool for the candidate virtual machine comprising a new application mix of a plurality of applications with at least one change from a present application pool currently assigned to the candidate virtual machine, wherein the at least one change in the present application pool comprises a change in a number of applications included in the present application pool assigned to the candidate virtual machine, wherein the new application pool comprises at least two applications which are assigned to the candidate virtual machine,
wherein a configuration file comprises the new application pool and a reallocation list of the plurality of performance metrics includes the memory usage and the CPU usage assigned to each of the plurality of applications assigned to the candidate virtual machine, wherein each of the plurality of applications have different configuration mixes of amounts of the memory usage and the CPU usage assigned to the respective plurality of applications to be used by the candidate virtual machine;

transmit the configuration file to the candidate virtual machine; and reallocate at least one performance metric used by the candidate virtual machine based on the configuration file.

16. The non-transitory computer readable storage medium of claim 15, wherein the active application load is optimized by increasing a number of active applications currently operated by the candidate virtual machine.

17. The non-transitory computer readable storage medium of claim 15, wherein the active application load is optimized by decreasing a number of active applications currently operated by the candidate virtual machine.

18. The non-transitory computer readable storage medium of claim 15, wherein the plurality of performance metrics further comprises at least one of a number of active applications, an amount of processor (CPU) utilization, an amount of memory, and an amount of data storage.

19. The non-transitory computer readable storage medium of claim 15, wherein the instructions are further configured to cause the at least one processor to periodically repeat the determining of the plurality of performance metrics for each of the plurality of virtual machines to determine additional optimization modifications to the plurality of virtual machines.

20. The non-transitory computer readable storage medium of claim 15, comprising storing the new application pool based on the new application mix, which comprises a total number of applications and application names identifying each of the at least two applications assigned to the candidate virtual machine, in a configuration file.

* * * * *